(12) United States Patent
Nakashima et al.

(10) Patent No.: US 11,000,885 B2
(45) Date of Patent: May 11, 2021

(54) CONTAMINATED SOIL PURIFICATION METHOD

(71) Applicant: TAKENAKA CORPORATION, Osaka (JP)

(72) Inventors: Tomohiro Nakashima, Inzai (JP); Takaaki Shimizu, Inzai (JP); Haruka Kiyotomo, Inzai (JP); Yamato Shimizu, Inzai (JP); Nobuyasu Okuda, Inzai (JP); Yasuhide Furukawa, Inzai (JP); Yuji Yamazaki, Inzai (JP); Kazuhiro Mukai, Inzai (JP); Kaoru Inaba, Inzai (JP)

(73) Assignee: Takenaka Corporation, Osaka (JP)

( * ) Notice: Subject to any disclaimer, the term of this patent is extended or adjusted under 35 U.S.C. 154(b) by 17 days.

(21) Appl. No.: 16/329,741

(22) PCT Filed: Aug. 29, 2017

(86) PCT No.: PCT/JP2017/031017
§ 371 (c)(1),
(2) Date: Feb. 28, 2019

(87) PCT Pub. No.: WO2018/043508
PCT Pub. Date: Mar. 8, 2018

(65) Prior Publication Data
US 2019/0232347 A1 Aug. 1, 2019

(30) Foreign Application Priority Data

Aug. 31, 2016 (JP) .............................. JP2016-170144

(51) Int. Cl.
*B09C 1/00* (2006.01)
*B09C 1/08* (2006.01)
*B09C 1/10* (2006.01)
*B09C 1/02* (2006.01)
(Continued)

(52) U.S. Cl.
CPC .................. *B09C 1/08* (2013.01); *B09C 1/02* (2013.01); *B09C 1/10* (2013.01); *E21B 43/121* (2013.01); *G06N 5/04* (2013.01)

(58) Field of Classification Search
CPC .......... B09C 1/08; B09C 1/10; B09C 2101/00
See application file for complete search history.

(56) References Cited

U.S. PATENT DOCUMENTS 5,954,452 A * 9/1999 Goldstein ............... B01F 5/043
166/250.01
6,796,741 B1 * 9/2004 DeVaull, III ............ B09C 1/002
137/516.13
(Continued)

FOREIGN PATENT DOCUMENTS

JP       09-276841 A    10/1997
JP       11057731 A     3/1999
(Continued)

OTHER PUBLICATIONS

WIPO Application No. PCT/JP2017/031017, PCT International Search Report and Written Opinion of the International Searching Authority dated Oct. 3, 2017.

*Primary Examiner* — Janine M Kreck
(74) *Attorney, Agent, or Firm* — Alston & Bird LLP

(57) ABSTRACT

A contaminated soil purification system for decomposing a contaminant in contaminated soil E. The contaminated soil purification system includes: injecting, into contaminated soil through a water injection well, an injection liquid containing a purification agent to decompose a contaminant or an activator to stimulate biological decomposition by the purification agent; a process of measuring a concentration of the purification agent or the activator in groundwater in an observation well or in a pumping well, the observation well or the pumping well being provided at a location spaced apart from the water injection well; and a process of, based (Continued)

on the concentration that has been measured, automatically controlling an addition amount of the purification agent or the activator to the injection liquid or automatically controlling a pumping amount of water from the pumping well.

12 Claims, 11 Drawing Sheets

(51) Int. Cl.
*E21B 43/12* (2006.01)
*G06N 5/04* (2006.01)

(56) References Cited

U.S. PATENT DOCUMENTS

2003/0175082 A1* 9/2003 Liebert, Jr. .............. B09C 1/00
405/128.75
2010/0011062 A1* 1/2010 Araki .................... B09C 1/10
709/205
2010/0209194 A1* 8/2010 Guite .................... B09C 1/02
405/128.75

FOREIGN PATENT DOCUMENTS

| | | | |
|---|---|---|---|
| JP | 2002119951 A | 4/2002 |
| JP | 2002250026 A | 9/2002 |
| JP | 2003-300056 A | 10/2003 |
| JP | 2005-052733 A | 3/2005 |
| JP | 2006-007178 A | 1/2006 |
| JP | 2006-116509 A | 5/2006 |
| JP | 2007-098330 A | 4/2007 |
| JP | 2010-000454 A | 1/2010 |
| JP | 2011-005371 A | 1/2011 |
| JP | 2011-173037 A | 9/2011 |
| JP | 2016-168554 A | 9/2016 |

* cited by examiner

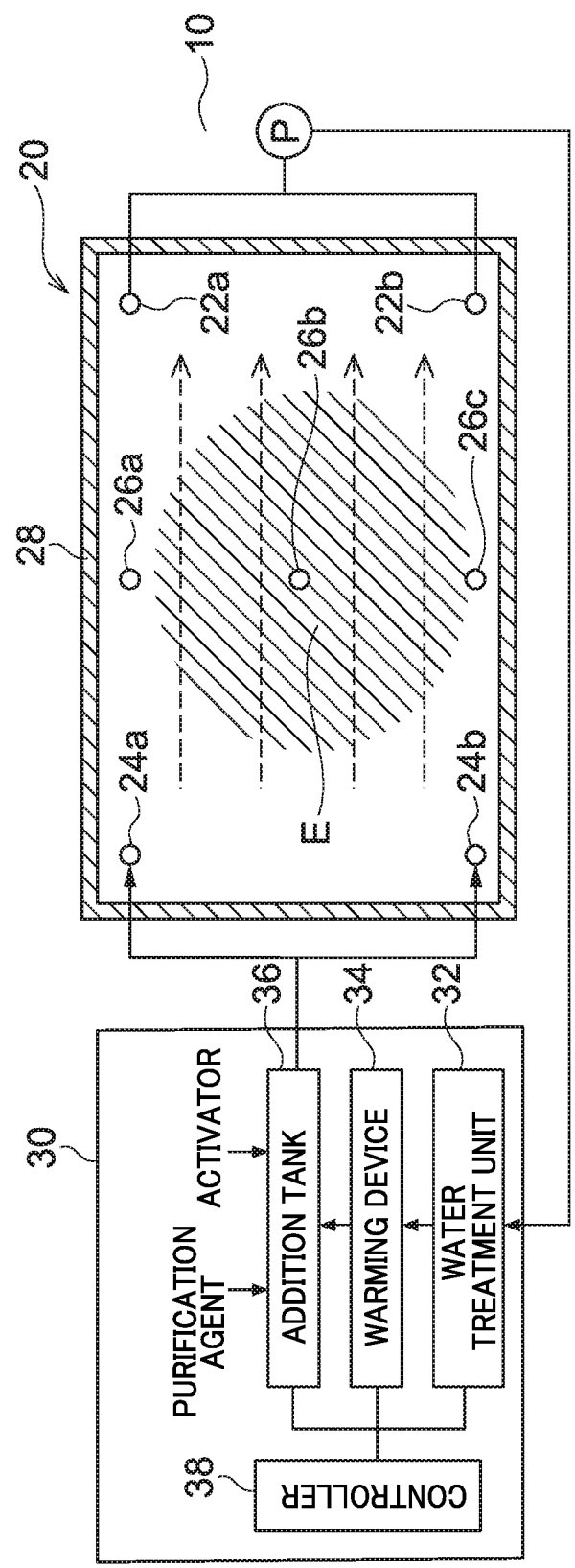

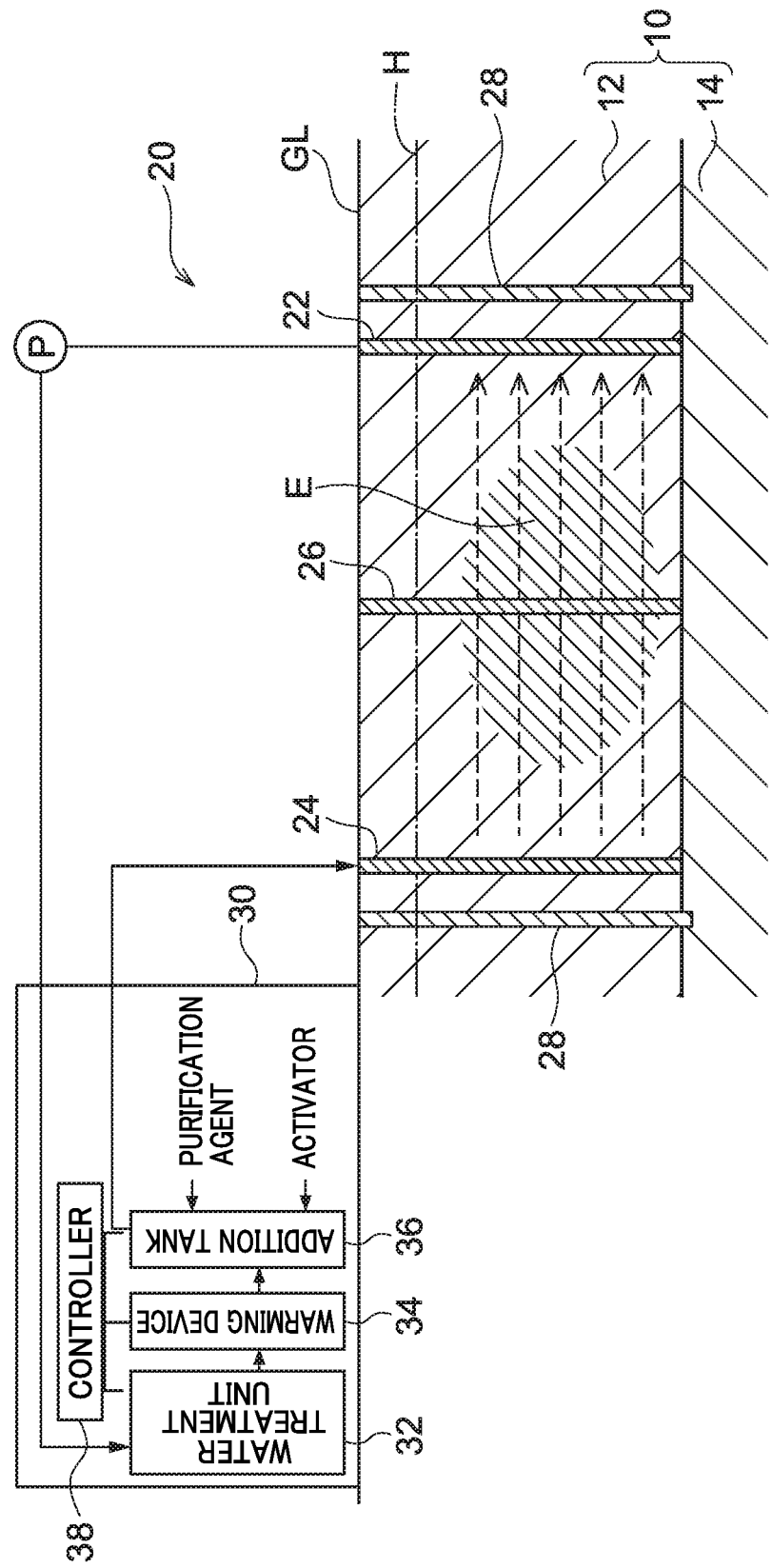

CONTAMINATED SOIL PURIFICATION METHOD

CROSS REFERENCE TO RELATED APPLICATIONS

This application is a National Stage Application, filed under 35 U.S.C. § 371, of International Application No. PCT/JP2017/031017, filed Aug. 29, 2017, which claims priority to Japanese Application No. 2016-170144, filed Aug. 31, 2016; the contents of which are hereby incorporated by reference in their entirety.

BACKGROUND

Technical Field

The present disclosure relates to a contaminated soil purification method.

Description of Related Art

Japanese Patent Application Laid-Open (JP-A) No. 2005-52733 discloses a purification unit in which a liquid to which an oil decomposition accelerator has been added is injected into oil-contaminated soil. The injected liquid permeates the contaminated soil and is pumped up from a water-collection well. The turbidity of the recovered liquid that has been pumped up is checked by a turbidity meter or by visual inspection by an operator, and the addition amount of the oil decomposition accelerator for injection into the contaminated soil is regulated.

BRIEF SUMMARY

In the purification unit disclosed in JP-A No. 2005-52733, checking of the recovered liquid and regulation of the addition amount of oil decomposition accelerator for injection into the contaminated soil needs to be performed by a manual operation on each occasion and so takes effort to perform.

In consideration of the above circumstances, an object of the present disclosure is to provide a contaminated soil purification method enabling an operation to purify contaminated soil to be performed with less manpower.

A contaminated soil purification method of a first aspect of the present disclosure is a contaminated soil purification method for decomposing a contaminant in contaminated soil. The contaminated soil purification method includes: a process of injecting, into contaminated soil through a water injection well, an injection liquid containing a purification agent to decompose a contaminant or an activator to stimulate biological decomposition by the purification agent; a process of measuring a concentration of the purification agent or the activator in groundwater in an observation well or in a pumping well, the observation well or the pumping well being provided at a location spaced apart from the water injection well; and a process of, based on the concentration that has been measured, automatically controlling an addition amount of the purification agent or the activator to the injection liquid or automatically controlling a pumping amount of water from the pumping well.

In the contaminated soil purification method of the first aspect of the present disclosure, the in-situ concentration of the purification agent or the activator in the groundwater is measured in the observation well or the water pumping well. The addition amount of the purification agent or the activator or the pumping rate of water from the water pumping well is then automatically controlled based on the concentration that has been measured. For example, if the concentration that has been measured (namely, the concentration of the activator in the contaminated soil) is lower than a target concentration, the addition amount of the activator to the injection liquid is automatically increased. Or the pumping rate is automatically increased to raise the suction force on the groundwater so as to promote permeation of the activator into the contaminated soil. The concentration of the activator is thereby regulated in a timely manner so as to enable efficient purification of the contaminated soil.

In a contaminated soil purification method of a second aspect of the present disclosure further comprising, predicting a time at which the concentration of the purification agent or the activator in the groundwater in the observation well or in the pumping well will reach a target concentration, or a time at which a groundwater temperature of the groundwater in the observation well or in the pumping well will reach a target temperature, using a management function. The management function calculates, at regular elapsed time intervals, a predicted concentration of the purification agent or the activator in the groundwater, or a predicted temperature of the groundwater, based on an initial concentration of the purification agent or the activator in the groundwater, or an initial temperature of the groundwater in the observation well or in the pumping well, prior to starting injection of the injection liquid, based on an injection concentration of the purification agent or the activator in the injection liquid or an injection temperature of the injection liquid injected into the contaminated soil through the water injection well, based on an elapsed time from a start of injection of the injection liquid, and based on inherent soil properties of the contaminated soil.

In the contaminated soil purification method of the second aspect of the present disclosure, the predicted concentration of the purification agent or the activator in the groundwater in the observation well or the water pumping well, or the predicted temperature of the groundwater, is calculated at regular elapsed time intervals using the management function.

The management function is able to calculate the predicted concentration of the purification agent or the activator in the groundwater or the predicted temperature of the groundwater at the regular elapsed time intervals based on the initial concentration of the purification agent or the activator in the groundwater or the initial temperature of the groundwater in the observation well or in the water pumping well prior to starting injection of the injection liquid, based on the injection concentration of the purification agent or the activator in the injection liquid or the injection temperature of the injection liquid, based on the elapsed time since the start of injection of the injection liquid, and based on the inherent soil properties of the contaminated soil.

Namely, the purification of the contaminated soil can be executed systematically by calculating the time required for the concentration of the purification agent or the activator in the groundwater in the contaminated soil or the temperature of the groundwater to reach the target value.

In the contaminated soil purification method of a third aspect of the present disclosure, the management function is corrected, such that the predicted concentration or the predicted temperature calculated using the management function approximates to an actual measured concentration of the purification agent or the activator in the groundwater or an actual measured temperature of the groundwater in the observation well or in the pumping well. The management function is corrected by replacing the initial concentration or the initial temperature with a concentration of the purification agent or the activator in the groundwater or a temperature of the groundwater in the observation well or in the pumping well after a predetermined time has elapsed, and changing the injection concentration or the injection temperature.

In the contaminated soil purification method of the third aspect of the present disclosure, the injection concentration or the injection temperature of the injection liquid is changed, the management function is also corrected based on the injection concentration or the injection temperature after the change, and the initial concentration or the initial temperature in the management function are replaced with the concentration or the temperature of the groundwater after the predetermined time has elapsed. The difference between the predicted concentration calculated by the management function and the actual measured concentration or the difference between the predicted temperature calculated by the management function and the actual measured temperature is thereby reduced, enabling the prediction accuracy of the management function to be raised.

Raising the prediction accuracy of the management function enables an injection liquid having an appropriate amount of the purification agent or the activator added thereto, or an injection liquid having an appropriate temperature, to be injected into the contaminated soil. The purification agent or the activator in the contaminated soil can thereby be suppressed from becoming excessive or insufficient.

The contaminated soil purification method according to the present disclosure enables an operation to purify contaminated soil to be performed with less manpower.

BRIEF DESCRIPTION OF DRAWINGS

FIG. 1A is a plan view illustrating an overall configuration of a contaminated soil purification system according to a first exemplary embodiment of the present disclosure.

FIG. 1B is a vertical cross-section illustrating an overall configuration of a contaminated soil purification system according to the first exemplary embodiment of the present disclosure.

DETAILED DESCRIPTION

Figure 2:
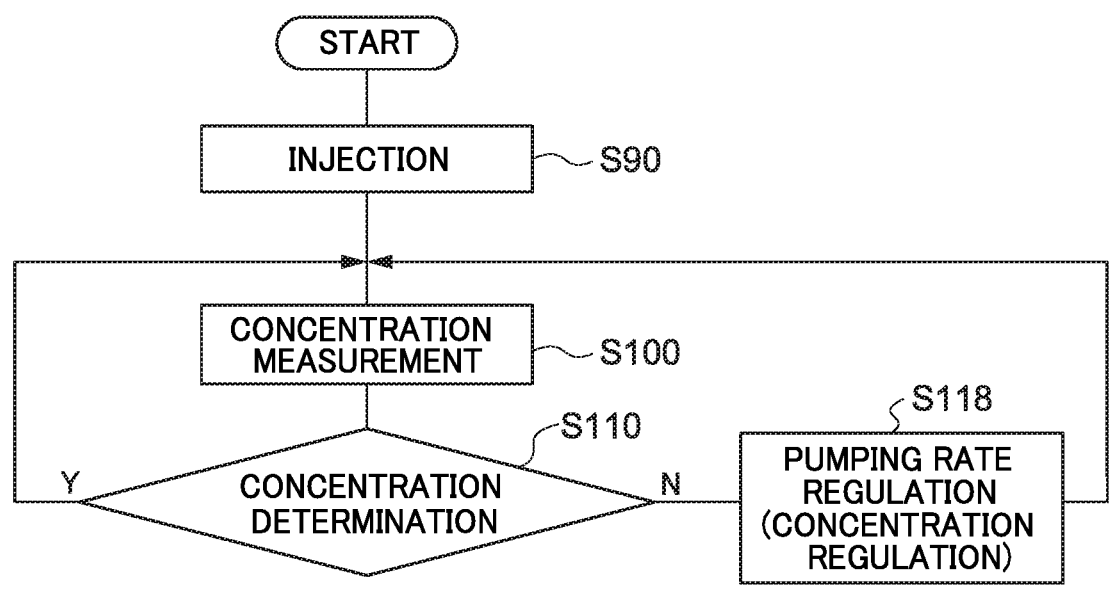
FIG. 2 is a flowchart illustrating a soil purification method of a contaminated soil purification system according to the first exemplary embodiment of the present disclosure.

Explanation follows regarding exemplary embodiments of the present disclosure, with reference to the drawings. Note that explanation regarding common configuration elements represented by the same reference numerals in plural drawings is sometimes omitted.

First Exemplary Embodiment

Overall Configuration

A contaminated soil purification system 20 of a first exemplary embodiment illustrated in FIG. 1A and FIG. 1B is a contaminated soil purification system used to decompose contaminants contained in subsurface soil 10. The contaminated soil purification system 20 includes water pumping wells 22, water injection wells 24, observation wells 26, and a water-shielding wall 28, each constructed in the subsurface soil 10, and a purification unit 30 that is constructed above ground level GL and that circulates groundwater between the subsurface soil 10, the water pumping wells 22, and the water injection wells 24.

Contaminated Soil

The subsurface soil 10 is soil below the ground level GL, and includes an aquifer layer 12 through which groundwater flows, and an impermeable layer 14 through which groundwater does not flow. A portion of the subsurface soil 10 in which contaminants are present at a reference value or greater (for example a value set for each contaminant type) is referred to as contaminated soil E. The definition of "contaminants" includes organic substances such as tetrachloroethylene, trichloroethylene, cis-1,2-dichloroethylene, vinyl chloride monomers, benzene, and the like, inorganic compounds such as cyan, and mineral oils such as gasoline and diesel oil. Unless specifically stated otherwise, the following explanation envisages organic substances such as tetrachloroethylene, trichloroethylene, cis-1,2-dichloroethylene, and vinyl chloride monomers.

In FIG. 1B, a groundwater level H is indicated by a dotted-dashed line, and the direction of a flow of groundwater through the subsurface soil is indicated by dashed arrows. Note that the flow of groundwater is a flow generated by injecting an injection liquid containing a purification agent or activator, described later, into the subsurface soil 10 through the water injection wells 24, and pumping up groundwater through the water pumping wells 22.

Water Pumping Wells

The water pumping wells 22 are a water pumping means used to pump up groundwater from the subsurface soil 10. Groundwater in the aquifer layer 12 may be drawn up by pumps and the like, not illustrated in the drawings, and fed to the purification unit 30. The water pumping wells 22 are disposed between the contaminated soil E and the water-shielding wall 28, and the water pumping wells 22 are buried in the subsurface soil 10 such that lower ends of the water pumping wells 22 reach the impermeable layer 14.

Although, for convenience, only two water pumping wells 22a, 22b are illustrated in FIG. 1A, exemplary embodiments of the present disclosure are not limited thereto, and any appropriate number of the water pumping wells 22 may be disposed, according to the size of the site and so on.

Note that the water pumping wells 22 may be disposed within the contaminated soil E. Specific methods for pumping up water using the water pumping wells 22, and the profile, size, and the like of the water pumping wells 22 are known, and so detailed explanation thereof is omitted.

Water Injection Wells

The water injection wells 24 are an injection means used to inject injection liquid generated in the purification unit 30 into the subsurface soil 10. The injection liquid may be fed into the subsurface soil 10 using pumps and the like, not illustrated in the drawings. The water injection wells 24 are wells disposed between the contaminated soil E and the water-shielding wall 28 (namely, on the opposite side to the water pumping wells 22 from the perspective of the contaminated soil E), and are buried in the subsurface soil 10 such that lower ends of the water injection wells 24 reach the impermeable layer 14.

Although, for convenience, only two water injection wells 24a, 24b are illustrated in FIG. 1A, exemplary embodiments of the present disclosure are not limited thereto, and any appropriate number of the water injection wells 24 may be disposed, according to the size of the site and so on.

Note that the water injection wells 24 may be disposed within the contaminated soil E. Specific methods for injecting the injection liquid using the water injection wells 24, and the profile, size, and the like of the water injection wells 24 are known, and so detailed explanation thereof is omitted.

Observation Wells

The observation wells 26 are an observation means for observing the subsurface state. Here, the "subsurface state" refers to the state of groundwater in the subsurface soil 10 at positions where the observation wells 26 are buried, and includes, for example, the groundwater level, the groundwater temperature, the concentration of purification agent and activator in the groundwater, and the concentration of contaminants in the groundwater.

Various sensors, not illustrated in the drawings, are installed inside the observation wells 26. The sensors measure the groundwater level, the groundwater temperature, the concentration of purification agent and activator in the groundwater, the concentration of contaminants in the groundwater, and so on as mentioned above, and transmit measured values to a controller 38 of the purification unit 30 as electrical signals.

Note that the sensors are also installed inside the water pumping wells 22 and the water injection wells 24. Namely, the respective water pumping wells 22 and water injection wells 24 also function as observation means. In FIG. 1A and FIG. 1B, signal lines connecting the respective sensors to the controller 38 are omitted from illustration in order to avoid increasing the complexity of the drawings.

The observation wells 26 are buried at plural locations in the subsurface soil enclosed by the water-shielding wall 28. Although, for convenience, only three observation wells 26a, 26b, 26c are illustrated in FIG. 1A, exemplary embodiments of the present disclosure are not limited thereto, and any appropriate number of the observation wells 26 may be disposed, according to the size of the site and so on.

Water-Shielding Wall

The water-shielding wall 28 is a concrete water-shielding means disposed in the subsurface soil 10 so as to enclose the contaminated soil E and block the flow of groundwater between the inside and the outside of the water-shielding wall 28. Namely, the flow of groundwater through the subsurface soil 10 at the "outside" of the water-shielding wall 28 and the flow of groundwater through the subsurface soil 10 at the "inside" of the water-shielding wall 28 are prevented from affecting one another.

As illustrated in FIG. 1B, a lower end of the water-shielding wall 28 is embedded in the impermeable layer 14. The contaminated soil E is thus enclosed by the water-shielding wall 28 and the impermeable layer 14, suppressing the flow of contaminants out into the subsurface soil 10 on the outside of the water-shielding wall 28.

Purification Unit

The purification unit 30 is a device to purify the groundwater pumped up from the water pumping wells by adding a purification agent and an activator, described later, to the groundwater, and returning the groundwater to the subsurface soil 10. The purification unit 30 is configured including a water treatment unit 32, a warming device 34, an addition tank 36, and the controller 38.

Water Treatment Unit

The water treatment unit 32 feeds air into the groundwater pumped up from the water pumping wells to vaporize volatile contaminants and thus purify the groundwater.

Warming Device

The warming device 34 is configured including a heater, not illustrated in the drawings, that is temperature-controlled by the controller 38, described later, to warm the groundwater that has been purified in the water treatment unit 32. Warming the groundwater using the warming device 34 promotes reproduction of decomposer microorganisms that biodegrade contaminants in the subsurface soil 10, enabling the activity of the decomposing microorganisms to be increased.

Addition Tank

The addition tank 36 generates injection liquid by adding purification agent or activator to the groundwater. Specifically, the purification agent or activator is added to the groundwater inside the addition tank 36 by an injection device (not illustrated in the drawings) controlled by the controller 38, described later.

Here, the "purification agent" is a substance that decomposes contaminants in the subsurface soil 10, and is a decomposing microorganism (for example dehalococcoides) that biodegrades the contaminants. The "activator" is a substance that stimulates biodegradation by the purification agent, and yeast extract, for example, is employed therefor.

The purification agent or activator is added to the groundwater inside the addition tank 36 by the injection device (not illustrated in the drawings) controlled by the controller 38, described later, and the ground water added the purification agent or activator is agitated by an agitation device installed inside the addition tank 36 to generate the injection liquid to be injected into the subsurface soil 10 through the water injection wells 24.

Controller

The controller 38 receives, as electric signals, information regarding the groundwater level, groundwater temperature, concentration of the purification agent or activator in the groundwater, contaminant concentration of the groundwater, and so on measured by the sensors installed in the respective observation wells 26, water injection wells 24, and water pumping wells 22. The controller 38 controls driving of the water treatment unit 32, the warming device 34, the addition tank 36, and water pumps P according to the received information.

Purification Method

Explanation follows regarding the purification method of the contaminated soil E by the contaminated soil purification system 20 according to the first exemplary embodiment, with reference to the flowchart illustrated in FIG. 2.

First, at step 90, the injection liquid is "injected" into the subsurface soil 10 through the water injection wells 24. Specifically, the controller 38 controls the addition tank 36 illustrated in FIG. 1A and FIG. 1B such that the injection liquid to which the purification agent or activator has been added is injected into the water injection wells 24 from the addition tank 36. The addition amount of the purification agent or activator added to the injection liquid is set such that the concentration of the purification agent or activator in the injection liquid after addition becomes a target concentration of purification agent or activator in the subsurface soil 10.

Pumping up groundwater from the water pumping wells 22 using the water pumps P generates a water gradient in the groundwater, such that the injection liquid injected to the water injection wells 24 is dispersed into the subsurface soil 10 and the contaminated soil E from the water injection wells 24 at a target speed.

Next, "concentration measurement" is performed at step S100. Specifically, the sensors installed in the observation wells 26 measure the concentration of the purification agent or activator in the groundwater.

Next, "concentration determination" is performed at step S110. As the concentration determination, the controller 38 determines whether or not the actual measured concentration of the purification agent or the activator in the groundwater in the observation wells 26 measured at step S100 has reached a target concentration.

In cases in which the actual measured concentration has reached the target concentration, processing returns to step S100 and the concentration is measured again, and processing then proceeds to step S110 and the controller 38 determines whether or not the target concentration has been maintained. The concentration measurement and concentration determination are repeated in this manner such that the actual measured concentration is maintained at the target concentration. In cases in which the actual measured concentration has not reached the target concentration, processing proceeds to step S118.

"Pumping rate regulation" is performed at step S118. The pumping rate regulation is performed by the controller 38 controlling the water pumps P to increase the groundwater pumping force in the water pumping wells 22. The permeation force of the purification agent or activator into the contaminated soil E is thereby regulated such that the actual measured concentration approaches the target concentration.

Processing returns to step S100 and the concentration is measured again, and then processing proceeds to step S110 where the controller 38 repeats determination as to whether or not the actual measured concentration has reached the target concentration.

The concentration of the purification agent or activator in the groundwater in the contaminated soil E is maintained at the target concentration by repeating the above steps, and the contaminants in the contaminated soil E are gradually removed.

Note that in the present specification, unless specifically stated otherwise, the terms "pumping rate" and "injection rate" refer to the "volume (or flow rate)" of the groundwater and injection liquid per unit time moving between the purification unit 30 and the subsurface soil 10. The "addition amount" refers to the "mass" of the purification agent or activator added to the injection liquid per unit volume. The "concentration" refers to the "mass concentration". Note that the addition amount and concentration may be represented by volume and volume concentration respectively.

Operation and Advantageous Effects

In the contaminated soil purification system 20 according to the first exemplary embodiment, concentration measurement is performed at step S100 and concentration determination is performed at step S110. Moreover, pumping rate regulation is performed at step S118. This enables the concentration of the purification agent or activator in the groundwater in the subsurface soil 10 to be regulated in a timely manner without human intervention, thus enabling the contaminated soil to be purified efficiently.

Note that, although the concentration of the purification agent or activator in the groundwater in the "observation wells 26" is measured at step S100 in the present exemplary embodiment, exemplary embodiments of the present disclosure are not limited thereto. For example, the concentration of the purification agent or activator in the groundwater in the "water pumping wells 22" may be measured at step S100. Similar also applies in each of the subsequent exemplary embodiments described below.

In such cases, at step S110, determination is made as to whether or not the actual measured concentration of the purification agent or activator in the groundwater in the water pumping wells 22 has reached the target concentration, and the pumping rate regulation is performed at step S118 based on the determination result.

Moreover, although the "pumping rate regulation" is performed at step S118 in the present exemplary embodiment, exemplary embodiments of the present disclosure are not limited thereto. For example, instead of pumping rate regulation, "concentration regulation" may be performed to regulate the concentration of the purification agent or activator in the injection liquid. In such concentration regulation, the addition amount of the purification agent or activator to the groundwater in the addition tank 36 is controlled to regulate the concentration of the purification agent or activator in the injection liquid. The actual measured concentration of the groundwater in the observation wells 26 is accordingly made to approach the target concentration.

Second Exemplary Embodiment

A contaminated soil purification system according to a second exemplary embodiment employs the configuration and purification method of the contaminated soil purification system 20 according to the first exemplary embodiment, and additionally employs a management function, described below, to predict a time at which the concentration of the purification agent or activator in the groundwater in the subsurface soil 10 will reach the target concentration.

Management Function

Figure 3:
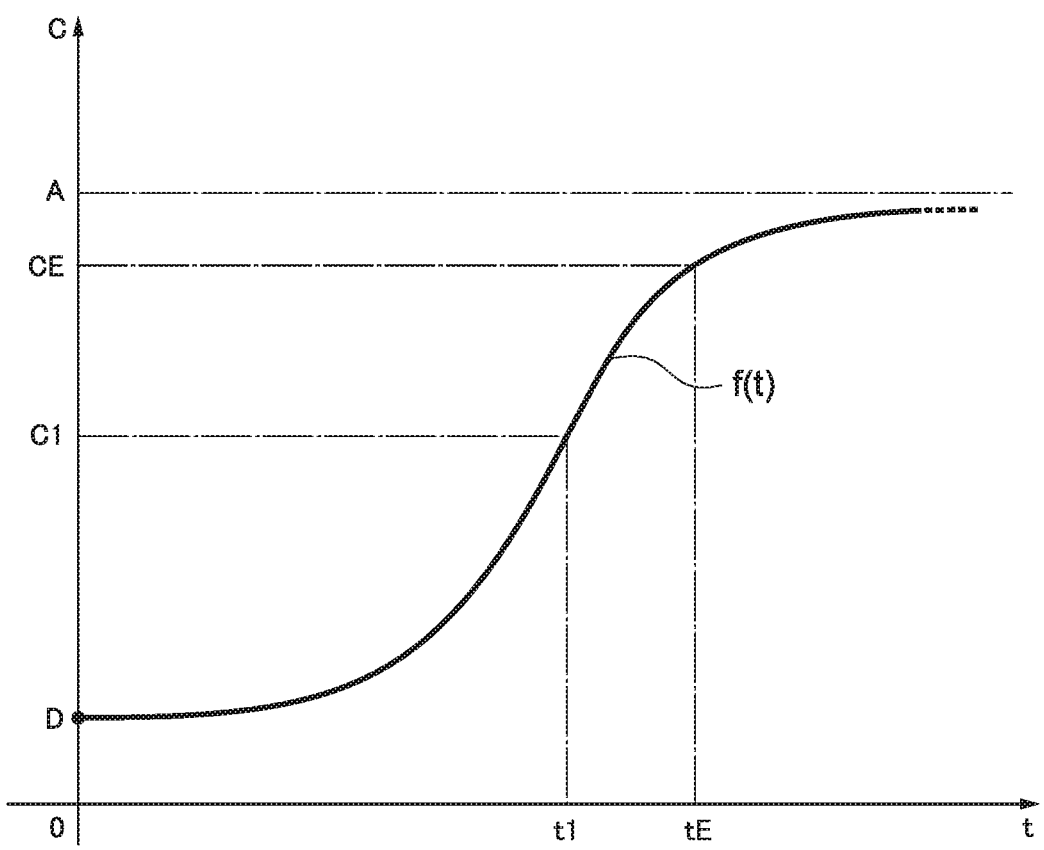
FIG. 3 is a graph illustrating a management function of a contaminated soil purification system according to a second exemplary embodiment of the present disclosure.

In FIG. 3, a management function f (t), representing a relationship between elapsed time t from the start of injection of the injection liquid into the subsurface soil 10 and a predicted concentration C of the groundwater in the observation wells 26, is illustrated by a solid line. For example, the predicted concentration at a time t1 is a predicted concentration C1.

The management function f (t) is represented by the following Equation.

$$f(t)=(A-D)/[1+(B/t)^G]+D \qquad \text{Equation 1}$$

A: concentration of purification agent or activator in injection liquid

B: constant determined by soil properties X of subsurface soil

G: constant determined by soil properties Y of subsurface soil

D: concentration of purification agent or activator in groundwater prior to injection liquid injection t: elapsed time since start of injection liquid injection The constants B, G in Equation 1 are constants determined by the soil properties X, Y of the subsurface soil, and are decided based on a soil survey carried out ahead of purifying the contaminated soil E. The factors employed in the soil survey used to decide the constants B, G includes, for example, the permeability coefficient of the subsurface soil and the soil particle size.

Operation and Advantageous Effects

In the contaminated soil purification system according to the second exemplary embodiment, the management function f (t) represented by Equation 1 is employed to calculate the predicted concentration of the groundwater in the observation wells 26 based on the concentration A of the purification agent or activator in the injection liquid injected to the water injection wells 24 at step S90 in FIG. 2, the concentration D of the purification agent or activator in the groundwater in the observation wells 26 prior to injecting the injection liquid, the constants B, G that are determined by the soil properties of the subsurface soil, and the elapsed time t since the start of injection of the injection liquid into the subsurface soil 10.

This enables prediction of a time tE at which the concentration of the purification agent or activator in the groundwater in the observation wells 26 will reach the target concentration CE illustrated in FIG. 3.

This also enables calculation of the appropriate settings for the concentration A of the purification agent or activator in the injection liquid (namely, what amount of the purification agent or activator should be added to the injection liquid) such that the concentration of the purification agent or activator in the groundwater reaches the target concentration CE by the time tE.

This facilitates estimation of the amount of resources, energy, time and the like required to purify the contaminated soil E, thus making project planning easier.

Note that a management function for the "temperature" of the groundwater in the observation wells 26 against elapsed time from the start of injection of the injection liquid to the subsurface soil 10 may be set in a similar manner.

In such cases, the concentrations A, D in Equation 1 would be respectively substituted by the temperature of the injection liquid and the temperature of the groundwater prior to injection of the injection liquid. Examples of survey results employed in order to decide the constants B, G include the specific heat and thermal conductivity of the subsurface soil. The vertical axis in FIG. 3 would be replaced with temperature.

By employing a management function to manage "temperature", a predicted temperature of the groundwater in the observation wells 26 is calculated at step S90 in FIG. 2 based on the temperature A of the injection liquid injected to the water injection wells 24, the temperature D of the groundwater in the observation wells 26 prior to injection of the injection liquid, the constants B, G that are determined by the soil properties of the subsurface soil, and the elapsed time t since the start of injection of the injection liquid to the subsurface soil 10.

This enables the time at which the groundwater temperature in the observation wells 26 will reach a target temperature to be predicted. This also enables calculation of the appropriate level of warming of the injection liquid in order for the temperature of the groundwater to reach the target temperature by the time that a predetermined time has elapsed. Setting a target temperature for the groundwater and regulating the warming rate of the injection liquid enables the groundwater temperature to be maintained at a temperature at which the decomposer microorganisms are highly active.

Note that in the present specification, the management functions for managing the "concentration" and for managing "temperature" are sometimes referred to collectively as the management function. The management function may thus be capable of setting either or both "concentration" and "temperature". Similar also applies in each of the subsequent exemplary embodiments described below.

Although, the management function is used to predict the time at which the groundwater concentration in the observation wells 26 will reach a target concentration in the present exemplary embodiment, exemplary embodiments of the present disclosure is not limited thereto. The time at which the groundwater concentration in the water pumping wells 22 will reach a target concentration may be predicted. Alternatively, the time at which the groundwater concentration in both the observation wells 26 and the water pumping wells 22 will reach a target concentration may be predicted. Similar also applies in each of the subsequent exemplary embodiments described below.

In this manner, the management function represents a predicted concentration of the purification agent or activator in the groundwater in the subsurface soil 10 at specific locations (for example the locations of the observation wells 26, or the locations of the water pumping wells 22), and does not represent a state of the subsurface soil 10 overall.

Accordingly, in cases in which the contamination state of the subsurface soil 10 is not uniform, in cases in which the flow of groundwater is not uniform, and the like, employing different management functions according to the differing contamination states and groundwater states enables the concentration of the purification agent or activator in the groundwater to be predicted for each location in which these states differ.

Figure 9:
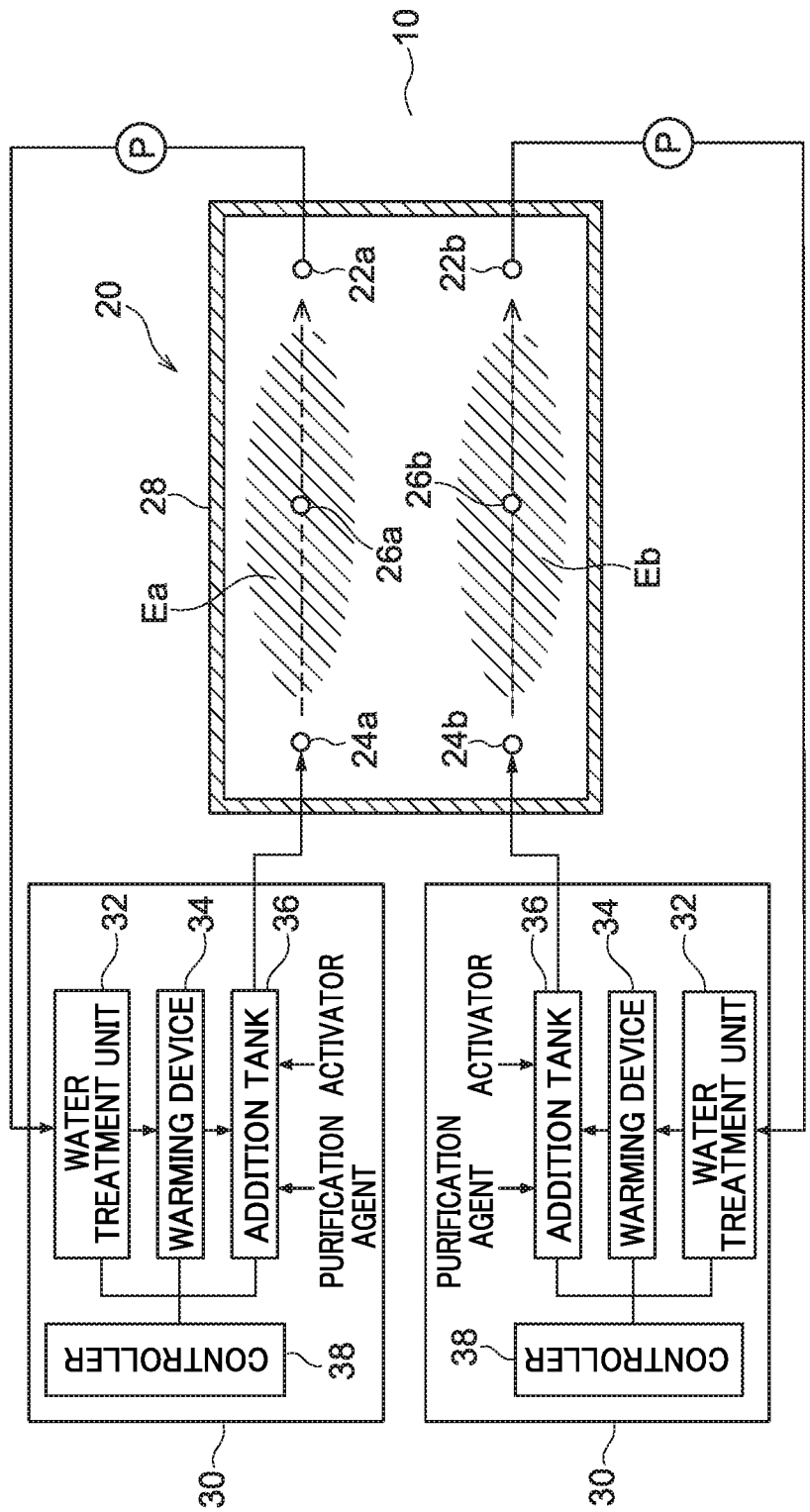
FIG. 9 is a plan view illustrating a modified example in which two types of contaminated soil with different contaminant concentrations are purified in a contaminated soil purification system according to the second exemplary embodiment of the present disclosure.

For example, FIG. 9 illustrates a state in which two types of contaminated soil Ea, Eb are formed in the subsurface soil 10. Since contaminant concentration differs between the contaminated soils Ea, Eb, the most appropriate temperature of the injection liquid for purifying the contaminant and the most appropriate concentration of the purification agent or activator to be added to the injection liquid will also differ from each other.

Figure 10:
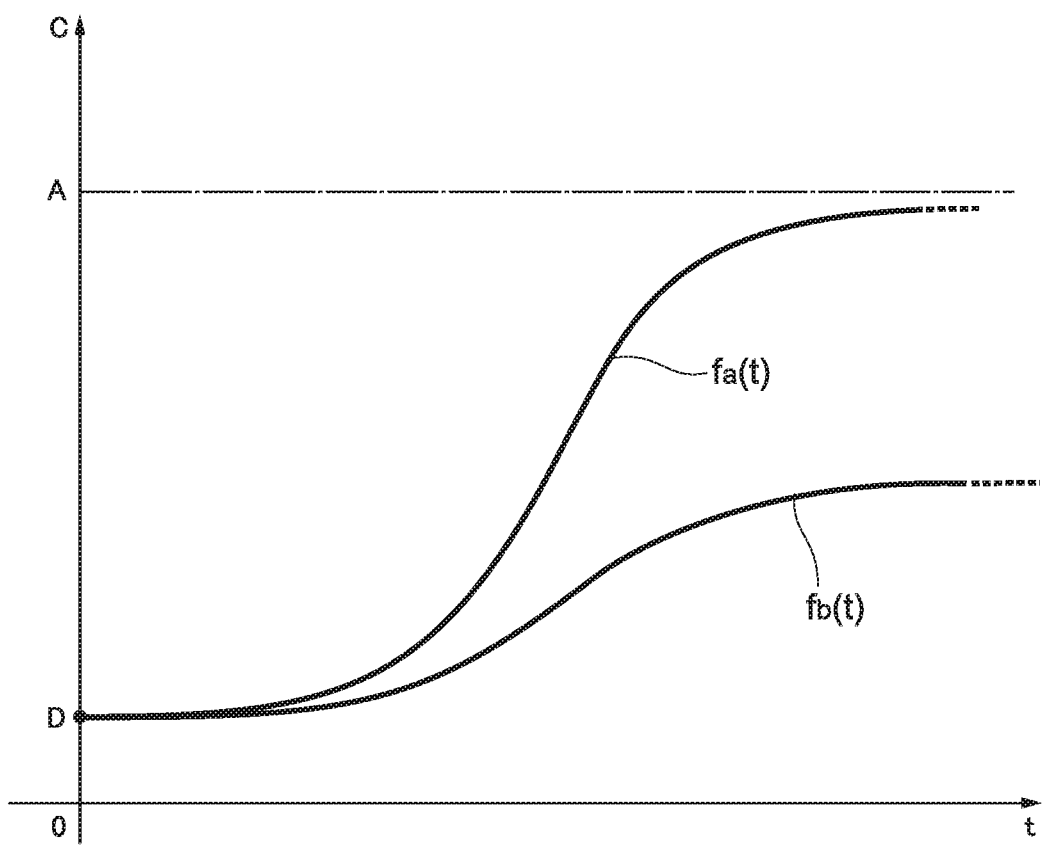
FIG. 10 is a graph illustrating two management functions employed in cases in which two types of contaminated soil with different contaminant concentrations are purified in a contaminated soil purification system according to the second exemplary embodiment of the present disclosure.

In such cases, for example, as illustrated in FIG. 10, management functions fa (t), fb (t) that are most appropriate to the respective contaminated soils Ea, Eb can be respectively set for a water injection/pumping system to purify the contaminated soil Ea in which the water pumping well 22a, the water injection well 24a, and the observation well 26a illustrated in FIG. 9 are provided, and a water injection/pumping system to purify the contaminated soil Eb in which the water pumping well 22b, the water injection well 24b, and the observation well 26b are provided.

Note that although, for convenience, FIG. 9 illustrates one of each of the water pumping wells, water injection wells, and observation wells in each water injection/pumping system, plural of each may be provided. An exemplary embodiment in which plural management functions are set for the subsurface soil 10 in this manner may also be applied in each of the subsequent exemplary embodiments described below.

Third Exemplary Embodiment

A contaminated soil purification system according to a third exemplary embodiment predicts the time at which the concentration of the purification agent or activator in the groundwater will reach a target concentration using a management function similarly to in the contaminated soil purification system according to the second exemplary embodiment, and additionally corrects the management function by comparing the predicted concentration calculated using the management function against an actual measured concentration.

Figure 4:
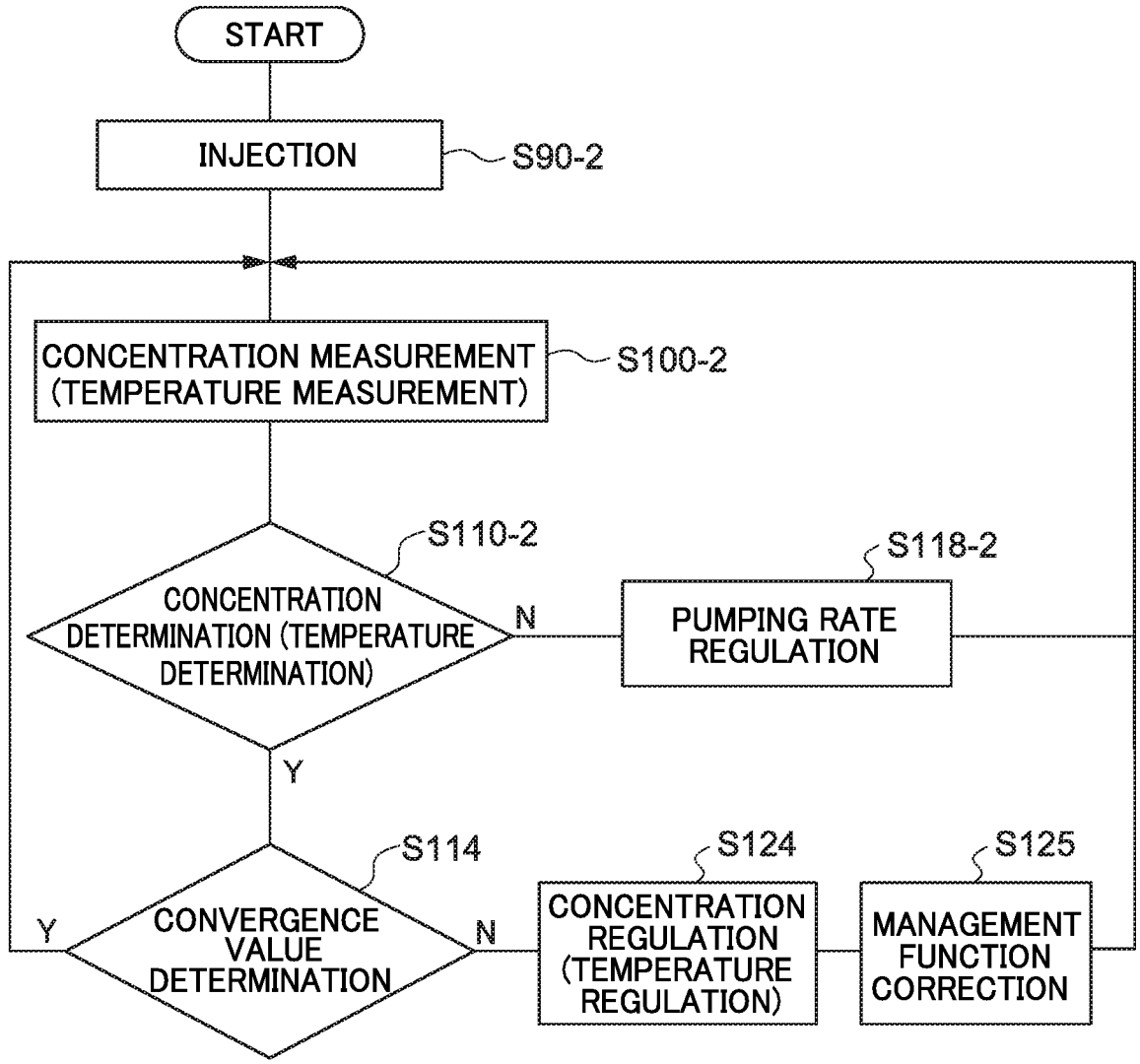
FIG. 4 is a flowchart illustrating a soil purification method of a contaminated soil purification system according to a third exemplary embodiment of the present disclosure.
Figure 5:
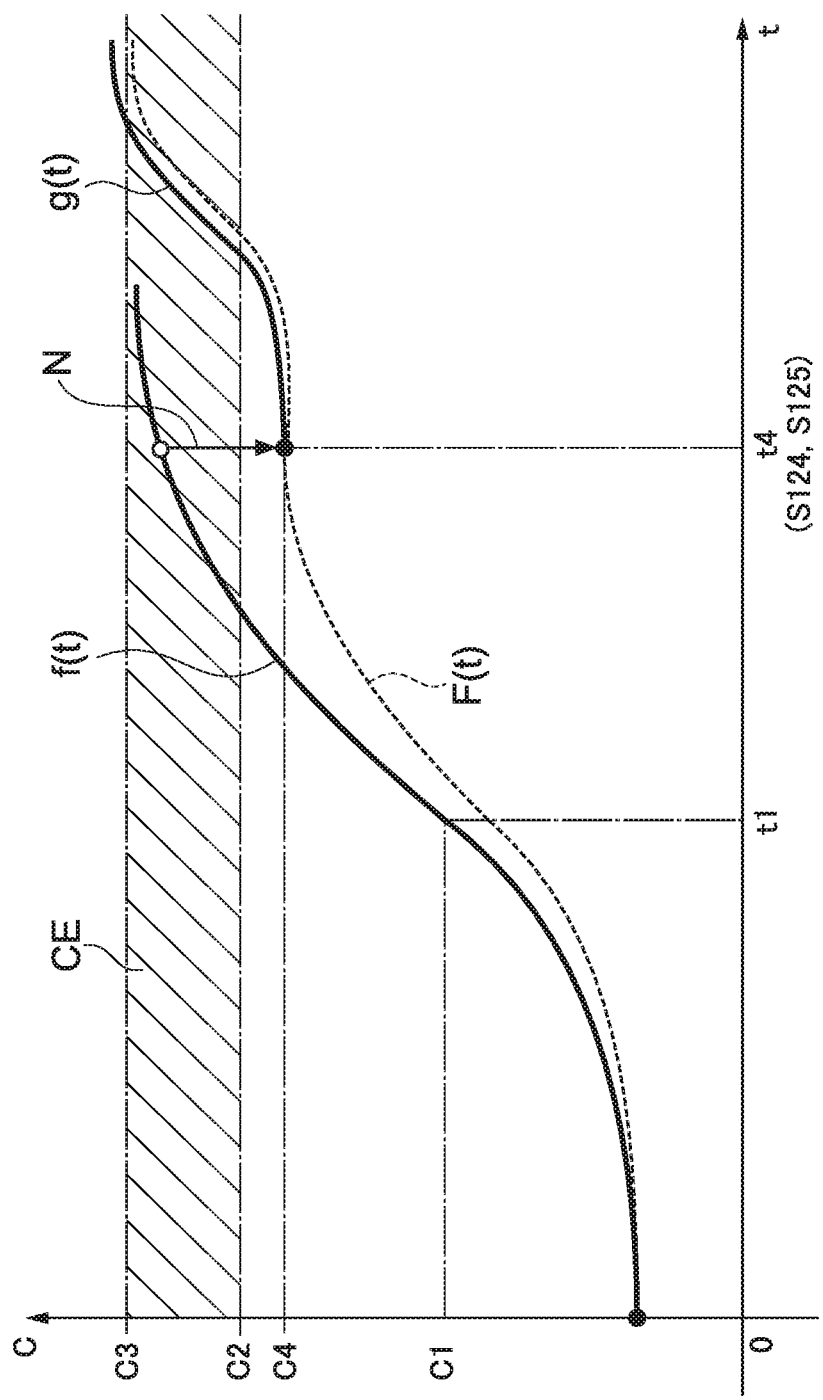
FIG. 5 is a graph illustrating management functions before and after correction and an actual measured concentration curve in a contaminated soil purification system according to the third exemplary embodiment of the present disclosure.

Explanation follows regarding the purification method of the contaminated soil E used by the contaminated soil purification system according to the third exemplary embodiment, with reference to the flowchart illustrated in FIG. 4 and the graph illustrated in FIG. 5. Explanation regarding elements similar to those of the first exemplary embodiment and the second exemplary embodiment is omitted as appropriate.

In the purification method of the third exemplary embodiment, first, at step S90-2 illustrated in FIG. 4, the injection liquid to which the purification agent or activator has been added is injected to the water injection wells 24 from the addition tank 36.

The management function described above is employed to calculate a predicted concentration of the groundwater in the observation wells 26 based on the concentration of the purification agent or activator in the injection liquid, the concentration of the purification agent or activator in the groundwater in the observation wells 26 prior to injecting the injection liquid, the soil properties of the subsurface soil, and the elapsed time t from the start of injection of the injection liquid into the subsurface soil 10. In FIG. 5, for example, the predicted concentration at the elapsed time t1 is C1.

The concentration of the injection liquid generated in the addition tank 36 at step 90-2 is regulated to an upper concentration limit C3 of a target concentration range CE, described later.

"Concentration measurement" at the next step S100-2 is similar to that at step S100 of the first exemplary embodiment, and so explanation thereof is omitted.

Next, "concentration determination" is performed at step S110-2. In this concentration determination, the controller 38 compares an actual measured concentration of the purification agent or activator in the groundwater in the observation wells 26 measured at step 100-2 against a predicted concentration of the purification agent or activator in the groundwater in the observation wells 26 predicted using the management function, and determines whether or not the difference obtained by subtracting the actual measured concentration from the predicted concentration is a preset permissible value or lower.

In cases in which the difference obtained by subtracting the actual measured concentration from the predicted concentration is the permissible value or lower, processing proceeds to step S114. In cases in which the difference is greater than the permissible value, processing proceeds to step S118-2.

"Pumping rate regulation" is performed at step S118-2. In this pumping rate regulation, the controller 38 controls the water pumps P to regulate the pumping rate in the water pumping wells 22. This changes the water gradient of the groundwater, thereby regulating the permeation force of the purification agent or activator through the contaminated soil E.

Whether or not the difference obtained by subtracting the actual measured concentration from the predicted concentration is within the permissible value is determined by processing returning to step S100-2 where the concentration of the purification agent or activator in the groundwater is measured by the sensors and, thereafter, processing proceeding to step S110-2 where the controller 38 compares the predicted concentration against the actual measured concentration. In cases in which the difference between the predicted concentration and the actual measured concentration is the permissible value or lower, processing proceeds to step S114.

"Convergence value determination" is performed at step S114. In this convergence value determination, the controller 38 determines whether or not the actual measured concentration measured at step 100-2 is stopping rising before reaching a predetermined target concentration range. The "target concentration range" is a concentration range of the purification agent or activator that enables the most efficient purification of the contaminated soil E, and is set in advance based on a soil survey carried out ahead of purifying the contaminated soil E.

As illustrated at the time t4 in FIG. 5, "the actual measured concentration is stopping rising" refers to a state in which the amount of increase in the actual measured concentration per unit time (namely, the slope of the actual measured concentration curve F (t), described later) approaches zero prior to reaching a lower concentration limit C2 of the target concentration range CE (namely, is stopping rising below a preset predetermined value), such that there is no prospect of the concentration of the purification agent or activator in the groundwater reaching the target concentration range CE, or more time than anticipated will be needed to reach of the target concentration range CE.

In cases in which the actual measured concentration continues to rise without stopping rising prior to reaching the target concentration range, processing returns to step S100-2, and steps S110-2 and S114 are repeated. In cases in which the actual measured concentration is stopping rising without reaching the target concentration range, processing proceeds to step S124.

"Concentration regulation" is performed at step S124. In this concentration regulation, the addition amount of the purification agent or activator to the groundwater in the addition tank 36 is controlled to increase the concentration of the purification agent or activator in the injection liquid. The actual measured concentration of the groundwater in the observation wells 26 is accordingly made to approach the target concentration range CE, resolving the situation in which the actual measured concentration is stopping rising.

Next, the management function is corrected at step S125 (the method for correcting the management function is described below), after which processing returns to step S100-2 and proceeds to step S114 in order to check whether or not the increase amount in the actual measured concentration per unit time has reached a predetermined value or greater. Whether or not the actual measured concentration has started to rise again is determined in this manner.

Management Function Correction

FIG. 5 illustrates the actual measured concentrations of the purification agent or activator in the groundwater in the observation wells 26 measured by the sensors installed in the observation wells 26 plotted at regular elapsed time intervals from the start of injection of the injection liquid through the water injection wells 24. The curve generated as an approximation to follow the plotted points is illustrated by a dashed line representing an actual measured concentration curve F (t).

As illustrated in step S114 (at the time t4 in FIG. 5) described above, in cases in which the actual measured concentration is stopping rising without reaching the target concentration range, the management function f (t) and the actual measured concentration curve F (t) diverge from each other, and so the reliability of predicted concentrations is low beyond the time t4 when using the management function f (t). In such cases, the management function is corrected to make the predicted concentrations approximate to the actual measured concentrations.

The management function g (t) illustrated in FIG. 5 has been corrected from the management function f (t). The correction method of the management function f (t) involves replacing the concentration A in Equation 1 with a concentration after regulating by the regulation at step S124, and replacing the concentration D in Equation 1 with the concentration C4 of the purification agent or activator in the groundwater at the time at which the concentration A was corrected (the time t4). As illustrated by the arrow N in FIG. 3, from the time t4 onward, the concentration of the purification agent or the activator in the groundwater is predicted based on the management function g (t).

Note that as described above, the management function may be set similarly for the "temperature" of the groundwater against elapsed time from the start of injection of the injection liquid into the subsurface soil 10.

In such cases, at step S100-2, "temperature measurement" is performed instead of "concentration measurement". Specifically, the temperature of the groundwater is measured by the sensors installed in the observation wells 26.

Moreover, at step S110-2, "temperature determination" is performed instead of "concentration determination". Specifically, the controller 38 compares the actual measured temperature of the groundwater in the observation wells 26 as measured at step 100-2 against the predicted temperature of the groundwater in the observation wells 26 predicted using the management function, and determines whether or not the actual measured temperature is within a predetermined range. More specifically, the controller 38 determines whether or not a difference obtained by subtracting the actual measured temperature from the predicted temperature is within preset permissible values.

In the "pumping rate regulation" at step S118-2, the force of permeation into the contaminated soil E of the injection liquid, which has a higher temperature than the groundwater, is regulated.

In the "convergence value determination" of step S114, the controller 38 determines whether or not the actual measured temperature measured at step 100-2 is stopping rising before reaching a predetermined target temperature range. The target temperature range is a temperature range of the groundwater at which the contaminated soil E can be purified most efficiently (namely, a temperature range in which the decomposer microorganisms become most active without being killed), and is set in advance based on a soil survey carried out ahead of purifying the contaminated soil E.

At step S124, "temperature regulation" is performed instead of "concentration regulation". In this temperature regulation, the controller 38 controls the output of the warming device 34 to raise the temperature of the injection liquid. The actual measured temperature of the groundwater in the observation wells 26 is accordingly made to approach the target temperature range CE.

Note that not only either one out of the management function used to predict the "concentration" of the purification agent or activator in the groundwater, and the management function used to predict the "temperature" of the groundwater, may be employed, but both may also be employed.

In such cases, "concentration measurement" and "temperature measurement" are performed at step S100-2, and "pumping rate regulation" is performed at step S118-2 in cases in which "concentration determination" and "temperature determination" have been performed at step S110-2 and at least one out of the actual measured concentration and the actual measured temperature has been determined to be outside of the preset permissible values. "Convergence value determination" is performed at step S114 to determine whether the actual measured concentration and the actual measured temperature are stopping rising. In cases in which at least one out of the actual measured concentration and the actual measured temperature is determined to be stopping rising, at least one out of "concentration regulation" or "temperature regulation" is performed at step S124 (namely, factor that was determined to be stopping rising at step S114 is regulated). At step S125, at least one out of the "management function to predict the concentration of the purification agent or the activator in the groundwater" or the "management function to predict the groundwater temperature" (namely, the management function relating to the concentration or the temperature regulated at step S124) is corrected.

Operation and Advantageous Effects

In the contaminated soil purification system according to the third exemplary embodiment, the management function is corrected in response to disparity between the values predicted by the management function and the actual measured values.

This thereby enables the prediction accuracy of the management function to be improved. It is accordingly possible to suppress injection of injection liquid containing purification agent or activator at an excessive concentration into the subsurface soil, and to suppress overheating of the injection liquid. Accordingly, wasted resources and energy can be reduced. Moreover, an insufficient amount of purification agent or activator contained in the injection liquid, and insufficient warmth of the injection liquid, can also be suppressed. This thereby enables the soil purification performance to be maintained.

Fourth Exemplary Embodiment

Figure 6:
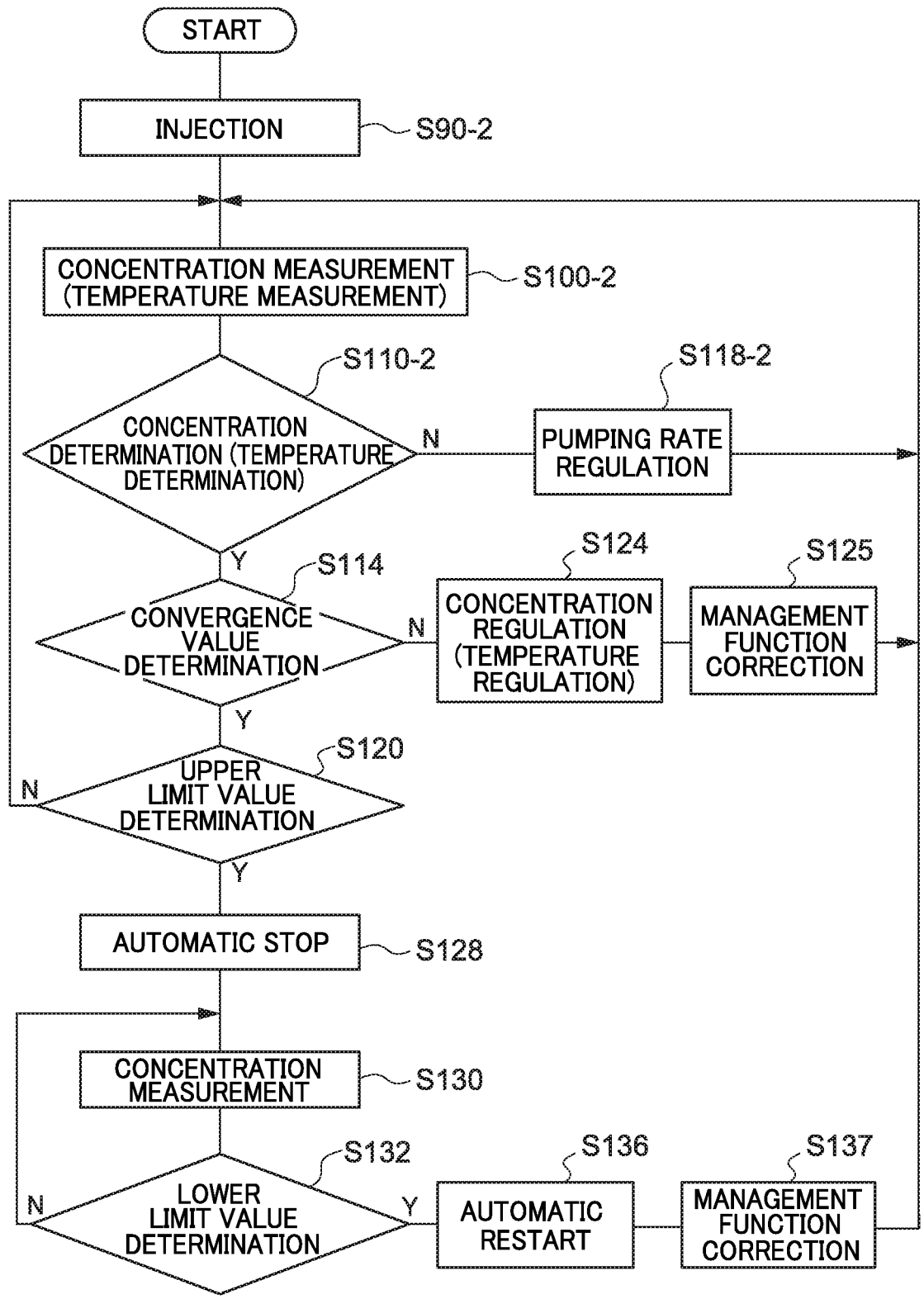
FIG. 6 is a flowchart illustrating a soil purification method of a contaminated soil purification system according to a fourth exemplary embodiment of the present disclosure.

As illustrated in FIG. 6, in a fourth exemplary embodiment, at step S114, in cases in which the actual measured concentration continues rising without stopping prior to reaching the target concentration range, processing proceeds to step S120 without returning to step S100-2.

At the steps subsequent to step S120, operation of the contaminated soil purification system is automatically stopped and automatically restarted in order to maintain the concentration of the purification agent or activator in the groundwater in the target concentration range.

More specifically, first, "upper limit value determination" is performed at step S120. In the upper limit value determination, determination is made as to whether or not the actual measured concentrations have reached a preset upper limit value. In the example illustrated in FIG. 7, the preset upper limit value is an upper concentration limit C3 of the target concentration range CE.

In cases in which the actual measured concentration has not reached the upper concentration limit C3, processing returns to step S100-2. As illustrated by the actual measured concentration curve F (t) at the time t3 in FIG. 7, in cases in which the actual measured concentration has reached the upper concentration limit C3, processing proceeds to step S128.

At step S128, a pump of the addition tank 36 and the water pumps P are controlled so as to stop injecting injection liquid into the subsurface soil 10 through the water injection wells 24 and to stop pumping up groundwater from the water pumping wells 22.

Next, "concentration measurement" is performed at step S130. Specifically, the sensors installed in the observation wells 26 measure the concentration of the purification agent or activator in the groundwater in the observation wells 26.

Next, "lower limit value determination" is performed at step S132. In this lower limit value determination, the controller 38 determines whether or not the concentration of the purification agent or activator in the groundwater that has decreased due to stopping injection of the injection liquid at step S128 has reached a preset lower limit value. The lower limit value is the lower concentration limit C2 of the target concentration range CE in FIG. 7.

In cases in which the concentration of the purification agent or activator in the groundwater has not reached the lower concentration limit C2 (namely, has not fallen as far as the lower concentration limit C2), processing returns to step S130. Namely, measurement and determination are repeated until the concentration of the purification agent or activator in the groundwater reaches the lower concentration limit C2. As illustrated at the time t2 in FIG. 7, in cases in which the concentration of the purification agent or activator in the groundwater has reached the lower concentration limit C2, processing proceeds to step S136.

At step S136, the controller 38 controls the addition tank 36 and the water pumps P so as to restart injection of the injection liquid into the subsurface soil 10 through the water injection wells 24 and restart pumping up of the groundwater through the water pumping wells 22.

Figure 7:
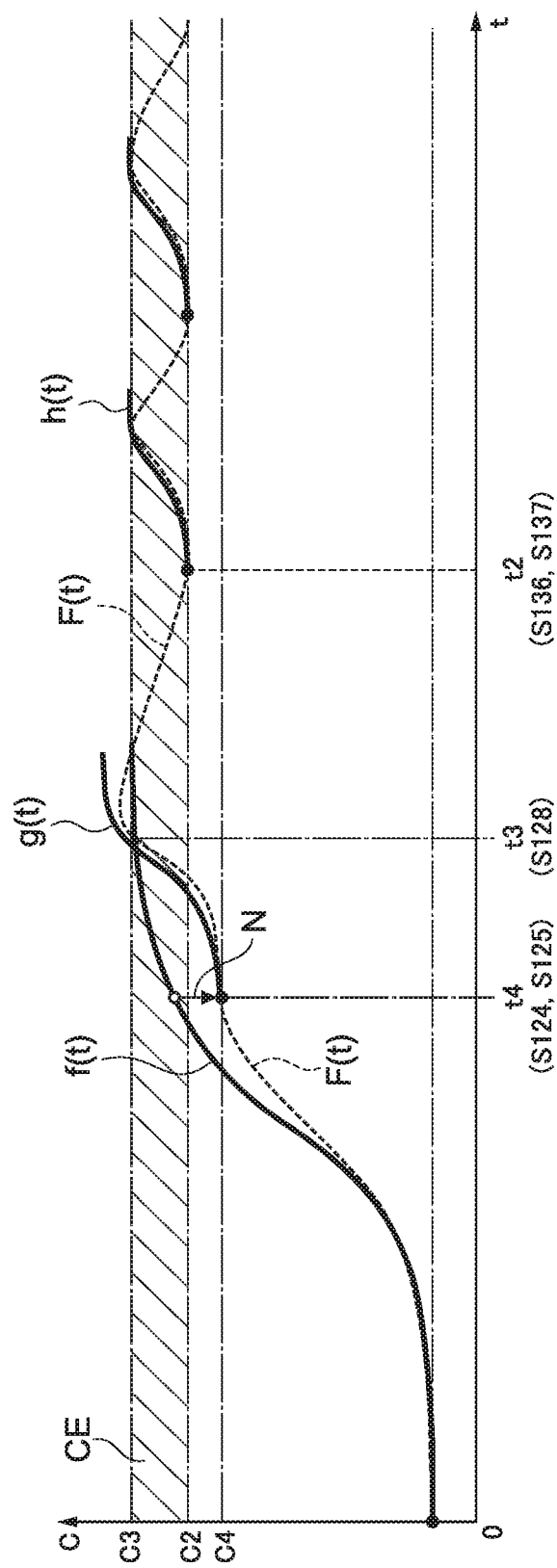
FIG. 7 is a graph illustrating a soil purification method of stopping and restarting injection of an injection liquid into subsurface soil in a contaminated soil purification system according to the fourth exemplary embodiment of the present disclosure.

Note that concentration prediction using a management function is not performed between stopping injection of the injection liquid at step S128 and restarting injection of the injection liquid at step S136. Specifically, as illustrated in FIG. 7, concentration prediction using a management function is not performed in a period from the time t3 at which the actual measured concentration reaches the upper concentration limit C3 of the target concentration range CE (namely, from when injection of the injection liquid is stopped) until the time t2 when the actual measured concentration reaches the lower concentration limit C2 (namely, until when injection of the injection liquid is restarted).

Moreover, after starting injection of the injection liquid at step S136, the management function is corrected at step S137, and the concentration is predicted using a new management function h (t). In the management function h (t), the value of the concentration A in Equation 1 is set to a desired value greater than the lower concentration limit C2, and the value of the concentration D in Equation 1 is set to the concentration (namely, the lower concentration limit) C2 at the timing when injection of the injection liquid is restarted at step S136.

Note that the "upper limit value determination" at step S120, the "concentration measurement" at step S130, the "lower limit value determination" at step S132, and the "management function correction" at step S137 may also be performed for temperature instead of concentration. Alternatively, they may be performed for both concentration and temperature. In cases in which these steps are performed for both concentration and temperature, injection of the injection liquid is stopped at step S128 in cases in which "both" the actual measured concentration and temperature are determined to have reached the upper concentration and temperature limit in the "upper limit value determination" at step S120. Injection of the injection liquid is restarted at step S136 in cases in which "at least one out of" the actual measured concentration or temperature is determined to have reached the lower concentration limit or temperature limit at step S132.

Operation and Advantageous Effects

In the contaminated soil purification system according to the fourth exemplary embodiment, the controller 38 stops and restarts injection of the injection liquid into the subsurface soil 10 based on the concentration of the purification agent or activator in the groundwater measured by the sensors installed in the observation wells 26.

This enables the concentration of the purification agent or activator in the subsurface soil 10 to be maintained within the target concentration range CE. This thereby enables the concentration of the purification agent or activator in the subsurface soil 10 to be suppressed from becoming insufficient or excessive.

Modified Examples

Explanation follows regarding various modified examples of the contaminated soil purification systems according to the first exemplary embodiment to the fourth exemplary embodiment.

Figure 8:
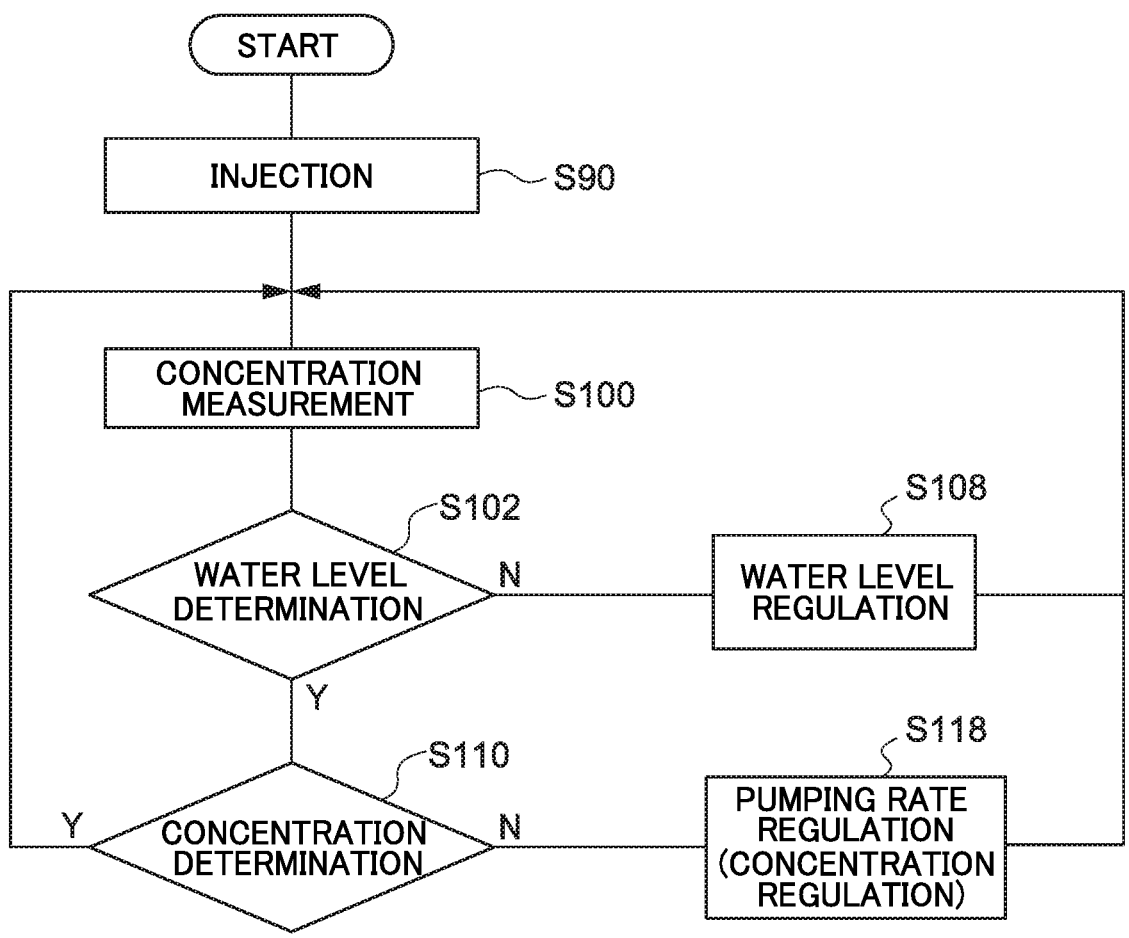
FIG. 8 is a flowchart illustrating a modified example of a soil purification method of a contaminated soil purification system according to the first exemplary embodiment of the present disclosure.

In the first exemplary embodiment, steps S102 and S108 may be interposed between steps S100 and S110 as illustrated in FIG. 8.

For example, "water level determination" is performed at step S102. In the water level determination, determination is made as to whether or not the "water level" of the water injection wells 24 into which the injection liquid is injected is an upper limit value or lower. Note that the upper limit value of the water level is a water level at which there would be a possibility of the groundwater overflowing from the water injection wells 24 if injection of the injection liquid to the water injection wells 24 were to continue.

In cases in which the water level of the water injection wells 24 is higher than the upper limit value, "water level regulation" is performed at step S108. In this water level regulation, groundwater is drawn out of the water injection wells 24, the water injection wells 24 are cleaned, and any blockages therein are removed in order to facilitate the flow of injection liquid from the water injection wells 24 into the contaminated soil E.

Note that although FIG. 8 illustrates "water level determination" and "water level regulation" as steps S102, S108, exemplary embodiments of the present disclosure are not limited thereto. For example, "injection concentration determination" may be performed at step S102. In this injection concentration determination, determination is made as to whether or not the concentration of the purification agent or activator in the injection liquid generated in the addition tank 36 is an upper limit value or lower. Note that the upper limit value of the concentration refers to the saturated concentration of the decomposer microorganisms in an aqueous solution.

In cases in which the concentration of the purification agent or activator in the injection liquid is higher than the upper limit value, "addition amount regulation" is performed at step S108. In this addition amount regulation, the addition amount of the purification agent or activator to the injection liquid in the addition tank 36 is decreased. This suppresses waste of the purification agent or activator.

Alternatively, for example, "injection temperature determination" may be performed at step S102. In this injection temperature determination, determination is made as to whether or not the temperature of the injection liquid in the addition tank 36 is an upper limit value or lower but also a lower limit value or higher.

In cases in which the temperature of the injection liquid is higher than the upper limit value, "warming regulation" is performed at step S108. In this warming regulation, the warming amount by the warming device 34 is decreased, thereby suppressing the decomposer microorganisms from being killed. In cases in which the temperature of the injection liquid is lower than the lower limit value, at step S108 the warming amount by the warming device 34 is increased, thereby maintaining the temperature required in order to stimulate the purification function of the decomposer microorganisms.

Alternatively, for example, "pumping rate determination" may be performed at step S102. In this pumping rate determination, determination is made as to whether or not the pumping rate is an upper limit value or lower but also a lower limit value or higher, based on measured values for the water level in the water pumping wells 22.

In cases in which the pumping rate is higher than the upper limit value, "pump regulation" is performed at step S108. In this pump regulation, the output of the water pumps P that pump up groundwater from the water pumping wells 22 is decreased, thereby preventing malfunction of the water pumps P. In cases in which the pumping rate is lower than the lower limit value, at step S108 the output of the water pumps P is raised so as not to fall below the injection rate of the injection liquid in the water injection wells 24.

Alternatively, for example, "flow determination" may be performed at step S102. In this flow determination, determination is made as to whether or not the flow of groundwater through the subsurface soil 10 is the envisaged flow, based on the respective water levels of the water pumping wells 22, the water injection wells 24, and the observation wells 26.

Note that "whether or not the flow of the groundwater is the envisaged flow" is determination as to whether or not a difference in water levels between the water injection wells 24, the water pumping wells 22, and the observation wells 26 is within an envisaged range. In cases in which the difference in water levels is large, the water gradient in the subsurface soil 10 is large, causing the flow of groundwater to be excessive compared to the envisaged flow. In cases in which the difference in water levels is small, the water gradient in the subsurface soil 10 is small, causing the flow of groundwater to be less than the envisaged flow.

In cases in which the flow of the groundwater is not the envisaged flow, "flow rate regulation" is performed at step S108. In this flow rate regulation, at least one out of the pumping rate of the water pumping wells 22 and the injection rate in the water injection wells 24 is regulated such that the groundwater flow becomes the envisaged flow. For example, in cases in which the water level in the water pumping wells 22 is higher than envisaged relative to the water level in the water injection wells 24 (namely, the difference in water levels is small), the output of the water pumps P is increased to make the pumping rate from the water pumping wells 22 greater.

Note that in the present exemplary embodiment, the lower end of the water-shielding wall 28 is embedded in the impermeable layer 14, blocking the flow of groundwater between the inside and outside of the water-shielding wall 28. This enables the flow of groundwater to be regulated by increasing the pumping rate, for example, but causes the water level of the groundwater to drop since groundwater is not supplied from outside the water-shielding wall 28. In such cases, the water level of the groundwater can be maintained at an appropriate height by increasing the water injection rate in addition to the pumping rate.

The "water level determination", "injection concentration determination", "injection temperature determination", "pumping rate determination", and "flow determination" described above as examples of step S102 may be employed in combination. Note that in cases in which these examples are applied at step S102, the measurements taken at step S100 are respectively of the "water level of the water injection wells 24", "concentration of the purification agent or activator in the injection liquid in the addition tank 36", "temperature of the injection liquid in the addition tank 36", "water level of the water pumping wells 22", or the "water levels of the water pumping wells 22, the water injection wells 24, and the observation wells 26".

Moreover, step S102 may also be performed at desired timings in the contaminated soil purification methods of the second to the fourth exemplary embodiments.

Moreover, although the water-shielding wall 28 illustrated in FIG. 1A and FIG. 1B is configured from a concrete material in the first to the fourth exemplary embodiments, exemplary embodiments of the present disclosure are not limited thereto. For example, frozen earth, clay, steel piling, a cement-improved body, or the like may be employed therefor. Moreover, the water-shielding wall 28 does not necessarily have to be provided. In cases in which the water-shielding wall 28 is not provided, the water injection wells 24 are preferably disposed on an upstream side of the flow of groundwater, and the water pumping wells 22 are preferably installed on the downstream side of the flow of groundwater. This enables injection liquid that has been injected into the subsurface soil 10 from the water injection wells 24 to be made to permeate the subsurface soil 10 smoothly.

Although water quality is improved by feeding air into the groundwater with the water treatment unit 32 illustrated in FIG. 1A and FIG. 1B in the first to the fourth exemplary embodiments, exemplary embodiments of the present disclosure are not limited thereto. For example, a method in which water quality is improved by adding purification agent to the groundwater to cause a reaction, or a method in which contaminants are separated from the groundwater by adsorption of the contaminants contained in the groundwater, may be employed as methods for improving the water quality.

As the purification agent in cases in which groundwater is purified by employing decomposer microorganisms to biodegrade contaminants, nutrient salts and oxygen may be mixed in, or fresh decomposer microorganisms may be mixed in. Moreover, a flocculant may be mixed in in order to achieve smooth injection of the injection liquid through the water injection wells 24.

Although the groundwater purified in the water treatment unit 32 is warmed by a heater in the first to the fourth exemplary embodiments, exemplary embodiments of the present disclosure are not limited thereto. For example, the groundwater may be warmed using heat exchange between a heating medium in an air conditioning device (not illustrated in the drawings) and the groundwater purified in the water treatment unit 32.

Moreover, although decomposer microorganisms are employed as the purification agent in the first to the fourth exemplary embodiments, exemplary embodiments of the present disclosure are not limited thereto. For example, chemical decomposition agents such as hydrogen peroxide, iron-based slurries, persulfates, Fenton's reagent, permanganates, or percarbonates may be employed to chemically decompose the contaminants.

Although yeast extract is employed as the activator in the first to the fourth exemplary embodiments, exemplary embodiments of the present disclosure are not limited thereto. For example, a hydrogen release compound (such as a polylactate ester), a high fatty acid ester, lactose, or the like may be employed therefor.

The purification agent and the activator may be added to the injection liquid independently of each other, or may be combined and then added. Moreover, plural types of purification agents may be added to the injection liquid, or plural types of activators may be added to the injection liquid. Moreover, in addition to purification agent and activators, a desired tracer substance may be added in order to facilitate measurement of the concentration of the purification agent and activator in the groundwater. Thus a contaminated soil purification system according to the present disclosure may combine various exemplary embodiments.

The disclosure of Japanese Patent Application No. 2016-170144, filed on Aug. 31, 2016, is incorporated in its entirety by reference herein. All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A contaminated soil purification method for decomposing a contaminant in contaminated soil, the contaminated soil purification method comprising:
injecting, into contaminated soil through a first well adapted for water injection, an injection liquid comprising a first agent;
measuring a concentration of the first agent in groundwater in a second well, the second well being provided at a location spaced apart from the first well;
based on the concentration of the first agent that has been measured, automatically controlling an addition amount of the first agent to the injection liquid or automatically controlling a pumping amount of water from the second well; and
determining a first time at which the concentration of the first agent in the groundwater in the second well will reach a target concentration, using a management function,
wherein the management function calculates, at regular elapsed time intervals, a predicted concentration of the first agent in the groundwater, based on:
an initial concentration of the first agent in the groundwater prior to starting injection of the injection liquid,
an injection concentration of the first agent in the injection liquid,
a first elapsed time from a start of injection of the injection liquid, and
soil properties of the contaminated soil,
wherein the first time is used for automatically controlling the addition amount of the first agent to the injection liquid or automatically controlling the pumping amount of water from the second well.

2. The contaminated soil purification method of claim 1, wherein the first agent comprises a purification agent to decompose a contaminant.

3. The contaminated soil purification method of claim 1, wherein the first agent comprises an activator to stimulate biological decomposition by a purification agent to decompose a contaminant.

4. The contaminated soil purification method of claim 1, wherein the second well is an observation well or a pumping well.

5. The contaminated soil purification method of claim 1, further comprising:
determining a second time at which a groundwater temperature of the groundwater in the second well will reach a target temperature, using the management function,
wherein the management function calculates, at regular elapsed time intervals, a predicted temperature of the groundwater, based on:
an initial temperature of the groundwater in the second well, prior to starting injection of the injection liquid,
an injection temperature of the injection liquid injected into the contaminated soil through the first well,
a second elapsed time from the start of injection of the injection liquid, and
soil properties of the contaminated soil,
wherein the second time is used for automatically controlling the pumping amount of water from the second well or a warming amount of the injection liquid.

6. The contaminated soil purification method of claim 5, wherein the soil properties of the contaminated soil is selected from the group consisting of a permeability coefficient and a soil particle size.

7. The contaminated soil purification method of claim 5, wherein:
the management function is corrected, such that the predicted concentration and the predicted temperature calculated using the management function are corrected to an actual measured concentration of the first agent in the groundwater and an actual measured temperature of the groundwater in the second well, by:
replacing the initial concentration and the initial temperature with a concentration of the first agent in the groundwater and a temperature of the groundwater in the second well after a predetermined time has elapsed, and
changing the injection concentration or the injection temperature.

8. The contaminated soil purification method of claim 1, wherein the soil properties of the contaminated soil is selected from the group consisting of a permeability coefficient and a soil particle size.

9. The contaminated soil purification method of claim 1, wherein:
the management function is corrected, such that the predicted concentration calculated using the management function is corrected to an actual measured concentration of the first agent in the groundwater, by:

replacing the initial concentration with a concentration of the first agent in the groundwater after a predetermined time has elapsed, and changing the injection concentration.

10. A contaminated soil purification method for decomposing a contaminant in contaminated soil, the contaminated soil purification method comprising:

injecting, into contaminated soil through a first well adapted for water injection, an injection liquid comprising a first agent;

measuring a concentration of the first agent in groundwater in a second well, the second well being provided at a location spaced apart from the first well;

based on the concentration of the first agent that has been measured, automatically controlling an addition amount of the first agent to the injection liquid or automatically controlling a pumping amount of water from the second well; and determining a time at which a groundwater temperature of the groundwater in the second well will reach a target temperature, using a management function, wherein the management function calculates, at regular elapsed time intervals, a predicted temperature of the groundwater, based on:

an initial temperature of the groundwater in the second well prior to starting injection of the injection liquid, an injection temperature of the injection liquid injected into the contaminated soil through the first well, an elapsed time from a start of injection of the injection liquid, and soil properties of the contaminated soil, wherein the determined time at which the groundwater temperature of the groundwater in the second well will reach a target temperature is used for automatically controlling the pumping amount of water from the second well or a warming amount of the injection liquid.

11. The contaminated soil purification method of claim 10, wherein the soil properties of the contaminated soil is selected from the group consisting of a permeability coefficient and a soil particle size.

12. The contaminated soil purification method of claim 10, wherein:

the management function is corrected, such that the predicted temperature calculated using the management function is corrected to an actual measured temperature of the groundwater in the second well, by:

replacing the initial temperature with a temperature of the groundwater in the second well after a predetermined time has elapsed, and changing the injection temperature.

* * * * *